Dec. 2, 1969    M. R. THORBURN    3,482,183
LASER APPARATUS
Filed Nov. 5, 1964    2 Sheets-Sheet 1

INVENTOR.
MILTON R. THORBURN
BY
ATTORNEY

Dec. 2, 1969  M. R. THORBURN  3,482,183

LASER APPARATUS

Filed Nov. 5, 1964  2 Sheets-Sheet 2

INVENTOR.
MILTON R. THORBURN
BY *James P. McAndrews*
ATTORNEY

United States Patent Office 3,482,183
Patented Dec. 2, 1969

3,482,183
LASER APPARATUS
Milton R. Thorburn, Southbridge, Mass., assignor to American Optical Company, Southbridge, Mass., a voluntary association of Massachusetts
Filed Nov. 5, 1964, Ser. No. 409,075
Int. Cl. H01s 3/05
U.S. Cl. 331—94.5                                    1 Claim

ABSTRACT OF THE DISCLOSURE

A liquid cooled laser device comprised of a core of laserable material enclosed in a light-transmitting tube. The tube has plane parallel opposite ends with reflectors press fitted against each end to form an optical resonant cavity. Means are provided for transmitting a coolant fluid such as water through the tube for cooling the core of laserable material.

---

The field of this invention is that of optical masers or lasers and the invention relates more particularly to a novel and improved construction for a laser apparatus.

A conventional laser apparatus comprises a rod of ruby or other laserable material having opposite rod ends which are plane and parallel to each other and which are silvered to reflect light. The apparatus also includes flash tube means or the like which direct light energy into the ruby rod to stimulate emission of a brief pulse of very intense energy from one end of the rod. A laser apparatus of this type cannot usually be operated to provide pulses of intense laser energy in very rapid sequence without becoming heated to such an extent that the intensity of the energy pulses emitted from the apparatus is greatly reduced. In one respect, at least, such an apparatus is also inconvenient to use in that the expensive laser rod must be removed from the apparatus from time to time to permit resilvering of the rod ends so that the energy output of the apparatus can be maintained at the proper level of efficiency.

It is an object of this invention to provide a novel and improved construction for a laser apparatus. It is a further object of this invention to provide such a laser apparatus which has a relatively high energy capacity and efficiency; to provide such an apparatus which can furnish a plurality of pulses of laser energy in very rapid sequence without significant reduction in the intensity of the energy pulses; and to provide such an apparatus which is of simple and economical construction. It is also an object of this invention to provide such an apparatus which can be conveniently used for a substantial period of time without requiring removal and resilvering of the expensive laser rod component of the apparatus.

Briefly described, the laser apparatus provided by this invention includes a laserable material such as a rod or other member of ruby or the like. The apparatus also includes a tube or cylinder of light-transmitting material such as quartz or the like having opposite tube ends which are plane and parallel to each other. The apparatus further includes a pair of plane reflectors at least one of which is partially light-transmitting. In a preferred embodiment of this invention, means such as a pair of adapter sleeves are fitted onto respective opposite ends of the ruby rod and are fitted snugly within the quartz cylinder for supporting the rod within the cylinder in coaxial relation to the cylinder. Spring means also resiliently hold the plane reflectors in parallel, facing, relation to each other against respective opposite ends of the cylinder. In a preferred embodiment of this invention, means direct a light-transmitting coolant fluid such as water through the cylinder for cooling the apparatus, and means, preferably including a flash tube or the like, direct light through the light-transmitting cylinder and coolant fluid for stimulating emission of a beam of laser energy from said apparatus through the partially transmitting reflector.

The laser apparatus of this invention is thus of simple and economical construction. The apparatus is also adapted to be cooled to operate at relative high capacity and efficiency and to have a relatively long useful life. In particular, the apparatus is adapted to emit a plurality of pulses of intense laser energy in rapid sequence without becoming overheated and without significant reduction in the intensity of the energy pulses provided by the apparatus. The apparatus is also convenient to use in that the plane reflectors mounted in parallel relation to each other at opposite ends of the apparatus cylinder can be easily arranged in parallel relation to each other and can be easily replaced whenever desired without requiring removal or handling of the expensive laser rod.

Other objects, advantages and details of the laser apparatus provided by this invention appear in the following detailed description of a preferred embodiment of the invention, the detailed description referring to the drawing in which.

Figure 1:
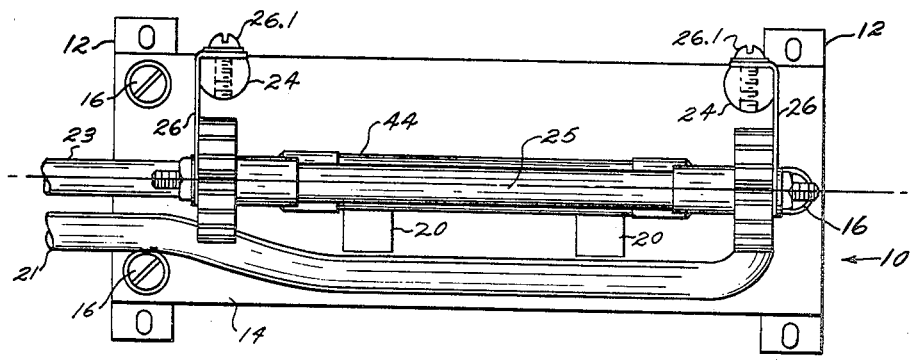
FIG. 1 is a plan view of the laser apparatus provided by this invention.

Referring to the drawings, 10 indicates the laser apparatus of this invention which is shown to include a pair of bars 12 and a platform plate 14 as well as screws 16 and helical springs 18 for attaching the plate to the bars. In this construction, the bars are adapted to be bolted within any suitable housing or mechanism (not shown) and the screws 16 are adapted to be adjusted for leveling or otherwise orienting the plate 14 above the bars.

Figure 2:
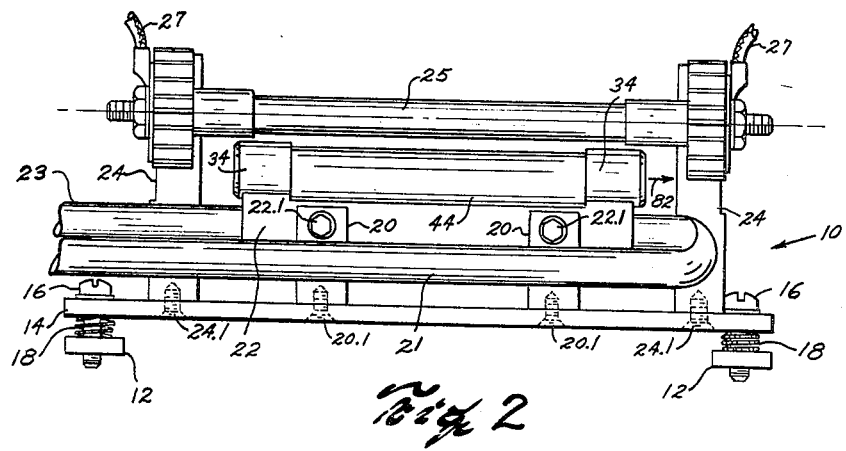
FIG. 2 is a front elevation view of the apparatus of FIG. 1.

Two blocks 20 are mounted on the platform plate 14 by screws 20.1 for supporting a frame member 22 which is secured to the blocks 20 by screws 22.1. Two other blocks 24, preferably of insulating plastic material or the like, are also attached to the platform plate by screws 24.1 and a bracket 26 is mounted on each block 24 by screws 26.1. A flash tube 25, electrically actuable through an electrical circuit diagrammatically illustrated in FIG. 2 by the leads 27, is mounted between the brackets 26 and is adapted to be actuated to provide an intense flash of light of a suitable wavelength whenever desired. As such flash tubes are conventionally employed as pumping means in the laser art for stimulating the emission of radiation from laserable materials, the flash tube 25 is not further described herein and it will be understood that the flash tube is adapted to serve as a laser pumping means in generally conventional manner.

Figure 4:
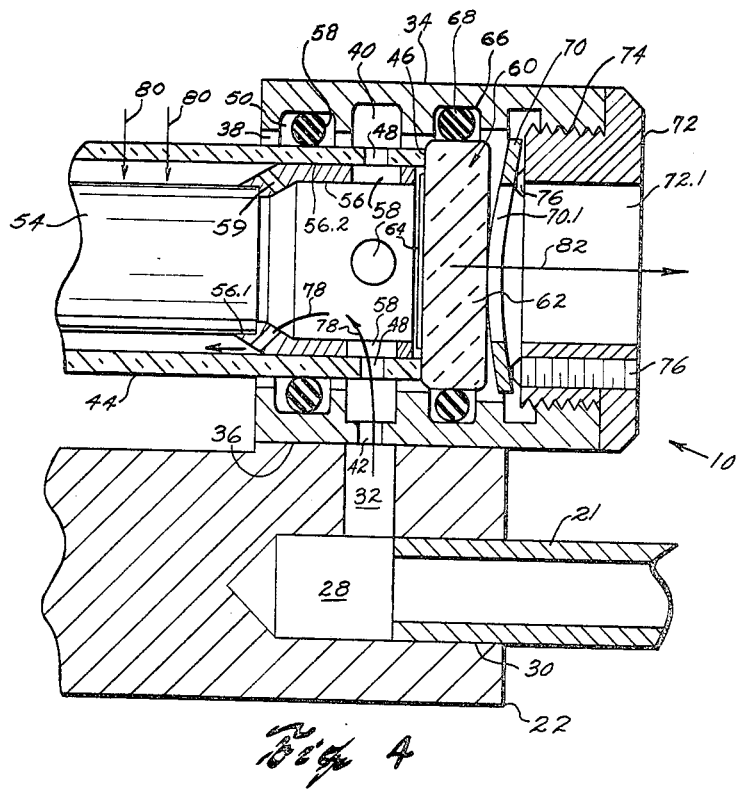
FIG. 4 is a partial section view to enlarged scale taken along line 4—4 of FIG. 3.
Figure 3:
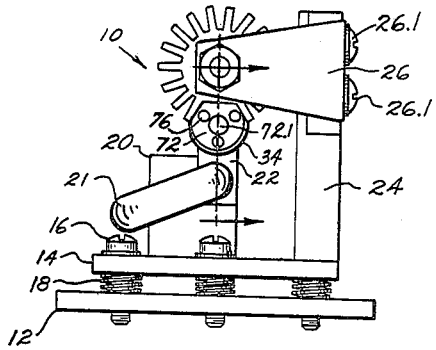
FIG. 3 is an end elevation view of the apparatus of FIG. 1.

In the apparatus 10, the frame member 22 is provided with a bore 28 at each end of the frame member and tubes 21 and 23 are soldered or otherwise sealed in respective bores 28 as at 30 in conventional manner. See FIG. 4. The frame member is also provided at each end with a port or passage 32. These ports 32 extend down from the top of the frame member to intersect respective bores 28 in the ends of the frame member. A sleeve 34 is then soldered or otherwise securely attached and sealed as at 36 to each end of the frame member 22, each sleeve having an axial bore 38, an annular groove 40 extending around the inside of the sleeve, and a sleeve port or opening 42 which is aligned with and connected to a corresponding port or opening 32 in the frame member. As the construction of the laser apparatus 10 is substantially the same at each end of the frame member 22, only one end of the frame member ends is illustrated in FIG. 4 and it will be understood that the apparatus structure at the opposite end of the frame member substantially corresponds to that illustrated in FIG. 4.

In accordance with this invention, a tube or cylinder 44 of light-transmitting material such as quartz, glass, plastic or the like extends between the frame member sleeves 34 just beneath the flash tube 25. This light-transmitting tube has opposite ends 46 (only one of which is illustrated in FIG. 4) which are made as nearly plane and parallel to each other as is practicable. The tube 44 is also provided with a series of ports or openings 48 which are circumferentially spaced around the tube at each end of the tube to communicate with the annular grooves 40 extending around the inside of the frame sleeves 34. Preferably the frame member sleeves 34 are also grooved as indicated at 50 in FIG. 4 for receiving an annular gasket 52 so that the tube 44 is sealed in liquid-tight relation to the frame member sleeve 34 at each end of the tube.

A rod 54 of selected laserable material such as ruby, neodymium-doped glass or the like is then arranged within the light-transmitting tube 44. As will be understood, the selected laserable material should be one which is adapted to be pumped by light of the wavelength provided by the flash tube 25 for stimulating emission of laser energy from the rod. Preferably, a pair of adapter sleeves 56 are fitted into respective opposite ends of the rod 54 for supporting the rod within the tube 44 in coaxial relation to the tube. For example, in the practical construction shown in FIG. 4, the hollow adapter sleeve 56 has a small diameter recess 56.1 at one end to receive one end of the laser rod 54 and has a relatively larger diameter portion 56.2 adapted to fit snugly within the tube 44 for centering the sleeve and rod in the tube. The adapter sleeves can be attached to the laser rod or the light-transmitting tube 44 by use of adhesive if desired for locating the rod 54 axially along the length of the tube 44. Alternatively, as shown in FIG. 4, the sleeves can be suitably sized so that, when fitted into opposite ends of the rod 54, they just fit within the tube 44 and support the rod 54 without being adhered or otherwise fixed to either the rod or the tube 44. The adapter sleeves 56 are preferably provided with a series of circumferentially spaced ports or openings 58 which communicate with corresponding ports 48 in the light-transmitting tube 44. The adapter sleeves are also preferably provided with another series of circumferentially spaced ports 59 which communicate with the central portions of the tube 44.

In a preferred embodiment, the apparatus of this invention also includes a pair of reflectors 60 each of which is preferably formed of a disc 62 of light-transmitting material such as glass, quartz or plastic having a plane, light-reflecting surface or coating 64 on one side. These reflectors are then mounted in parallel, facing relation to each other against the plane parallel opposite ends 46 of the light-transmitting tube 44. As the tube or cylinder 44 can be of relatively large diameter, the tube ends 46 provide relatively broad means against which to arrange the reflectors in accurately parallel relation to each other. In accordance with this invention, the light-reflecting surface or coating 64 on the reflector disc 60 shown in FIG. 4 is adapted for partially-reflecting and partially-transmitting light. However, the corresponding surface or coating 64 on the reflector 60 (not shown) located at the opposite end of the tube 44 is adapted for fully reflecting light for purposes explained below.

In a practical embodiment of this invention, the reflectors 60 are held resiliently against the ends 46 of the light-transmitting tube 44. For example, as shown in FIG. 4, each of the frame member sleeves 34 is provided with a second gasket groove 66 which receives an annular gasket 68 for sealing a reflector disc 60 in liquid-tight relation within the sleeve 34. A spring washer 70 having a central opening 70.1 is arranged to bear resiliently against each reflector disc 60 and a collar 72 having a central opening 72.1 is threadedly engaged with each frame sleeve 34 as at 74. Preferably each collar 72 has three set screws 76 therein making three, point contacts with the spring washer 70. In this construction, the collars 72 are rotatable in the sleeves 34 to bear against the spring washers 70 for resiliently holding the reflector discs 60 in parallel relation to each other against the tube ends 46. The set screws 76 are also adjustable for fine adjustment of the parallelism of the discs 60 as will be understood.

In accordance with this invention, means diagrammatically indicated in the drawings by the conduit 21 are adapted to pump or otherwise direct a stream of light-transmitting coolant fluid through a frame member port 28 and through communicating ports in other apparatus components into the tube or cylinder 44 as is diagrammatically indicated in FIG. 4 by the arrows 78. This coolant fluid 78 flows through the tube 44 around the laser rod 54 and, as will be understood, flows out of the tube 44 into the conduit 23 through corresponding ports or openings in apparatus components at the opposite end of the tube 44. In the preferred embodiment of this invention, the coolant fluid comprises water but other light-transmitting fluids such as air could also be directed through the tube 44 within the scope of this invention. As the means indicated by the conduit 21 for pumping the coolant fluid 78 through the tube 44 can be completely conventional, the pumping means are not further described herein and it will be understood that any conventional fluid circulating means can be employed for directing coolant fluid 78 through the tube 44 in the manner described.

In operating the laser apparatus 10 above described, the collars 74 and set screws 76 are adjusted if necessary to arrange the reflectors 60 within the apparatus in precisely parallel, facing relation to each other. The light-transmitting coolant fluid is then directed through the tube 44 around the rod 54 of the selected laserable material. The flash tube 25 is then actuated for emitting a flash of laser pumping light or energy which is directed through the light-transmitting aparatus tube 44 and through the light-transmitting fluid 78 into the laser rod 54 as indicated in FIG. 4 by the arrows 80. Where the rod 54 is formed of ruby, the cylinder 44 is preferably formed of quartz for high transmission of ruby laser pumping energy. This laser pumping energy then stimulates emission of a beam of laser energy from the laser rod 54, which beam of energy is emitted from the apparatus 10 through the partially-transmitting reflector 60 as is indicated by the arrow 82 in FIG. 4.

It can be seen that the laser apparatus 10 described above embodies conventional laser components including a rod of laserable material, reflector means located at the ends of the laser rod and flash tube means for pumping the laser rod to stimulate emission of a beam of laser energy from the rod. However, the novel apparatus 10 also includes end reflectors 60 which are removable and includes a light-transmitting cylinder 44 which not only serves to mount the removable reflectors 60 in parallel relation to each other but which also provides excellent means for cooling the laser rod within the apparatus without significantly interfering with pumping of light into the laser rod to stimulate the emission of laser energy. In this arrangement, the apparatus 10 can be operated at high capacity and efficiency to provide a plurality of pulses of laser energy in rapid sequence without tending to overheat. The apparatus is also convenient to use and to maintain at top efficiency in that the apparatus end reflectors can be conveniently adjusted or removed and replaced.

It should be understood that the laser apparatus 10 has been described above by way of illustration but that this invention includes all modifications and equivalents of the described apparatus which fall within the scope of the appended claim.

I claim:
1. A laser apparatus comprising an elongated rod of laserable material, a tube of rigid light-transmitting material of greater length than said rod completely surrounding said rod throughout the length thereof, said tube having accurately finished plane end surfaces formed on the opposite ends thereof in precisely parallel relation to each other, said tube having an inner diameter of a materially greater dimension than the diameter of said rod, a pair of adapter sleeves snugly fitting within said tube and supporting the respective opposite end portions of said rod in substantially coaxial relation to said tube, openings in said sleeves for allowing the flow of a fluid coolant therethrough, a pair of rigid disc-like members for closing the opposite ends of said tube and each having a precisely flat reflective surface formed thereon, means resiliently engaging said members so as to press said reflective surfaces respectively into fluid-tight sealing engagement with the opposite end surfaces of said tube and thus into plane parallel facing relation to each other, said facing reflective surfaces defining an optical resonant cavity including said rod of laser material therebetween, at least one of said disc-like members and reflective surface thereon being partially light-transmissive at the laser emission wavelength of said laserable material, entrance and exit ports in said tube adjacent opposite ends thereof for allowing flow of a transparent fluid coolant into and out of the space within said tube and surrounding said rod, and conduit means communicating with said ports for supplying fluid coolant to said apparatus.

References Cited

UNITED STATES PATENTS

| | | | |
|---|---|---|---|
| 3,225,307 | 12/1965 | Weissman | 331—94.5 |
| 3,359,812 | 12/1967 | Everitt | 331—94.5 |
| 3,387,226 | 6/1968 | Haisma et al. | 331—94.5 |
| 3,102,920 | 9/1963 | Sirons | 331—94.5 |
| 3,202,934 | 8/1965 | Coffee | 331—94.5 |
| 3,209,281 | 9/1965 | Colgate et al. | 331—94.5 |
| 3,293,564 | 12/1966 | Fan | 331—94.5 |

RONALD L. WIBERT, Primary Examiner